US009578284B2

(12) United States Patent
Walker et al.

(10) Patent No.: US 9,578,284 B2
(45) Date of Patent: *Feb. 21, 2017

(54) METHODS AND APPARATUSES FOR VIDEO AND TEXT IN COMMUNICATION GREETINGS FOR THE AUDIBLY-IMPAIRED

(71) Applicant: Sorenson Communications, Inc., Salt Lake City, UT (US)

(72) Inventors: Merle L. Walker, Salt Lake City, UT (US); Tara Lalor, Salt Lake City, UT (US); David Frye, Salt Lake City, UT (US); Kevin Selman, Salt Lake City, UT (US); Cameron Dadgari, Salt Lake City, UT (US); Lane Walters, Salt Lake City, UT (US)

(73) Assignee: Sorenson Communications, Inc., Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/053,999

(22) Filed: Feb. 25, 2016

(65) Prior Publication Data

US 2016/0198121 A1 Jul. 7, 2016

Related U.S. Application Data

(63) Continuation of application No. 14/540,961, filed on Nov. 13, 2014, now Pat. No. 9,276,971.

(51) Int. Cl.
*H04N 7/14* (2006.01)
*H04L 29/06* (2006.01)
*G09B 21/00* (2006.01)

(52) U.S. Cl.
CPC ............ *H04N 7/147* (2013.01); *G09B 21/009* (2013.01); *H04L 65/1059* (2013.01); *H04L 65/1089* (2013.01)

(58) Field of Classification Search
CPC ........................................ H04N 7/14
USPC ............. 348/14.01, 14.03, 14.06, 14.08
See application file for complete search history.

(56) References Cited

U.S. PATENT DOCUMENTS

| 6,477,239 B1* | 11/2002 | Ohki ............... G09B 21/009 348/14.01 |
| 6,662,007 B2 | 12/2003 | Yuen |
| 7,170,977 B2 | 1/2007 | Doherty et al. |
| 7,295,663 B2 | 11/2007 | McLaughlin et al. |
| 7,978,827 B1* | 7/2011 | Becker ............ H04M 3/42391 379/52 |
| 8,111,813 B2 | 2/2012 | Weber et al. |

(Continued)

*Primary Examiner* — Olisa Anwah
(74) *Attorney, Agent, or Firm* — TraskBritt

(57) ABSTRACT

Methods and apparatuses for enabling electronic communication with an audibly-impaired user are disclosed. A communication device receives a call from a video endpoint associated with a calling party, wherein the call is intended for the audibly-impaired user. If the audibly-impaired user is unavailable to receive the call, information is selected from a database with one or more entries associated with the audibly-impaired user. The one or more entries include a video greeting previously recorded by the audibly-impaired user and a text greeting previously entered by the audibly-impaired user. The video greeting and the text greeting are combined as a merged video stream. The merged video stream is then presented on the video endpoint associated with the calling party.

22 Claims, 9 Drawing Sheets

(56) References Cited

U.S. PATENT DOCUMENTS

| | | | |
|---|---|---|---|
| 2002/0025026 A1* | 2/2002 | Gerszberg | H04M 1/2478 379/67.1 |
| 2004/0210603 A1* | 10/2004 | Roston | G06F 17/2836 |
| 2005/0086699 A1* | 4/2005 | Hahn | H04M 3/42391 725/106 |
| 2006/0234193 A1* | 10/2006 | Sahashi | H04M 3/567 434/112 |
| 2007/0036282 A1* | 2/2007 | Engelke | H04M 3/42391 379/52 |
| 2007/0081646 A1 | 4/2007 | Cupal et al. | |
| 2008/0273077 A1 | 11/2008 | Cowherd | |
| 2009/0028300 A1 | 1/2009 | McLaughlin | |
| 2009/0092234 A1 | 4/2009 | St. Onge et al. | |
| 2009/0323911 A1 | 12/2009 | Dury | |
| 2010/0020944 A1 | 1/2010 | Ray | |
| 2010/0066803 A1* | 3/2010 | Robotka | H04M 3/42 348/14.02 |
| 2012/0249723 A1 | 10/2012 | Nelson et al. | |
| 2012/0269331 A1* | 10/2012 | Harris | H04M 7/003 379/52 |
| 2013/0044179 A1 | 2/2013 | Peng | |
| 2013/0093830 A1* | 4/2013 | Richardson | H04N 7/147 348/14.01 |
| 2013/0152092 A1* | 6/2013 | Yadgar | H04M 3/4936 718/102 |
| 2014/0270100 A1 | 9/2014 | Barton et al. | |
| 2015/0019201 A1* | 1/2015 | Schoenbach | G06F 17/289 704/8 |
| 2015/0022616 A1* | 1/2015 | Talbot | H04N 7/147 348/14.01 |
| 2015/0131786 A1* | 5/2015 | Roach | H04M 3/42382 379/52 |
| 2016/0062987 A1* | 3/2016 | Yapamanu | G10L 15/005 704/2 |

\* cited by examiner

Database Table – Deaf Party Contact-Specific Greetings

| | Name | Phone | Text greeting | Video greeting |
|---|---|---|---|---|
| 1 | Sis | 800-555-1212 | Hi Sis, please leave a message. | Video file 1 |
| 2 | Dad | 802-555-1212 | Hi Dad, can't come to the phone now. | Video file 2 |
| . | | | | |
| . | | | | |
| . | | | | |
| n | John | 801-555-1212 | <blank> | |

Database Table – Deaf Party Default Greetings

| | Deaf Party | Default Text Greeting | Default Video Greeting |
|---|---|---|---|
| 1 | Custom 1 | Hi, You've reached John, please leave a message | Video file 3 |
| 2 | Custom 2 | I am on vacation | Video file 3 |
| 3 | Custom 3 | I am in a meeting from 1 to 2 today | Video file 4 |
| . | | | |
| . | | | |
| . | | | |
| n | | . | |

METHODS AND APPARATUSES FOR VIDEO AND TEXT IN COMMUNICATION GREETINGS FOR THE AUDIBLY-IMPAIRED

CROSS REFERENCE TO RELATED APPLICATION

This patent application is a continuation of U.S. patent application Ser. No. 14/540,961, filed Nov. 13, 2014 (U.S. Pat. No. 9,276,971), the entire disclosure of which is hereby incorporated herein in its entirety by this reference.

TECHNICAL FIELD

Embodiments discussed herein relate generally to video phone communication systems, and more specifically, to methods and apparatuses for providing customized greeting(s) in communications for audibly-impaired persons.

BACKGROUND

Traditional communication systems, such as standard and cellular telephone systems, enable verbal communications between people at different locations. Communication systems for audibly-impaired individuals (e.g., individuals with hearing impairments, speech impairments, or a combination thereof) enable non-audible communications. For example, some such communication systems enable audibly-impaired individuals to communicate using communication endpoints (e.g., video endpoints, text endpoints, etc.) configured to transmit and receive non-audible communications (e.g., video, text, etc.).

These communication endpoints are sometimes registered with entities that provide services for audibly-impaired users (e.g., communication session enabling services, user account information databases, audible to non-audible communication translation, etc.).

Some communication systems for audibly-impaired people enable communications between communication devices for audibly-impaired people and communication systems for audibly-capable users (e.g., standard telephones, cellular telephones, etc.). For example, a Video Relay Service (VRS) may provide speech to sign language translation services, and sign language to speech translation services for a communication session between a video phone for an audibly-impaired user and a traditional telephone for an audibly-capable user. In other words, the VRS may be used so an audibly-impaired user can carry on conversations with an audibly-capable person. In such systems, the audibly-impaired user will use sign language to a translator and the translator will speak what is signed to the audibly-capable user. In the other direction, the translator will listen to the audibly-capable user then sign what was spoken to the audibly-impaired user.

SUMMARY

Embodiments discussed herein include methods and apparatuses that provide customized greeting(s) in communications for audibly-impaired users.

Embodiments of the disclosure include a method for enabling electronic communication with an audibly-impaired user. The method includes receiving a call on a communication device from a video endpoint associated with a calling party, wherein the call is intended for the audibly-impaired user. The method also includes determining that the audibly-impaired user is unavailable to receive the call. Responsive to this determination, information is selected from a database with one or more entries associated with the audibly-impaired user, wherein the one or more entries include a video greeting previously recorded by the audibly-impaired user and a text greeting previously entered by the audibly-impaired user. The video greeting and the text greeting are combined as a merged video stream and the merged video stream is presented on the video endpoint associated with the calling party.

Embodiments of the disclosure also include a server at a relay service associated with an audibly-impaired user. The server includes processing circuitry configured to receive a call from a video endpoint associated with a calling party, wherein the call is intended for the audibly-impaired user. The processing circuitry is also configured to determine that the audibly-impaired user is unavailable to receive the call and select information from a database with one or more entries associated with the audibly-impaired user, wherein the one or more entries include a video greeting previously recorded by the audibly-impaired user and a text greeting previously entered by the audibly-impaired user. The processing circuitry is also configured to send the video greeting to the video endpoint associated with the calling party and send the text greeting to the video endpoint associated with the calling party.

Embodiments of the disclosure further include a video endpoint associated with an audibly-impaired user. The video endpoint includes processing circuitry configured to receive a call from a video endpoint associated with a calling party. The processing circuitry is also configured to determine that the audibly-impaired user is unavailable to receive the call and select information from a database with one or more entries associated with the audibly-impaired user, wherein the one or more entries include a video greeting previously recorded by the audibly-impaired user and a text greeting previously entered by the audibly-impaired user. The processing circuitry is also configured to send the video greeting to the video endpoint associated with the calling party and send the text greeting to the video endpoint associated with the calling party.

Embodiments of the disclosure further include a video endpoint associated with an audibly-impaired user. The video endpoint includes processing circuitry configured to record an input video greeting including gestures from the audibly-impaired user and enable the audibly-impaired user to enter an input text greeting. The processing circuitry is also configured to send the video greeting and the text greeting to a relay service associated with the audibly-impaired user.

BRIEF DESCRIPTION OF THE DRAWINGS

FIGS. 4 and 5 are block diagrams illustrating entries in database.

DETAILED DESCRIPTION

Figure 1:
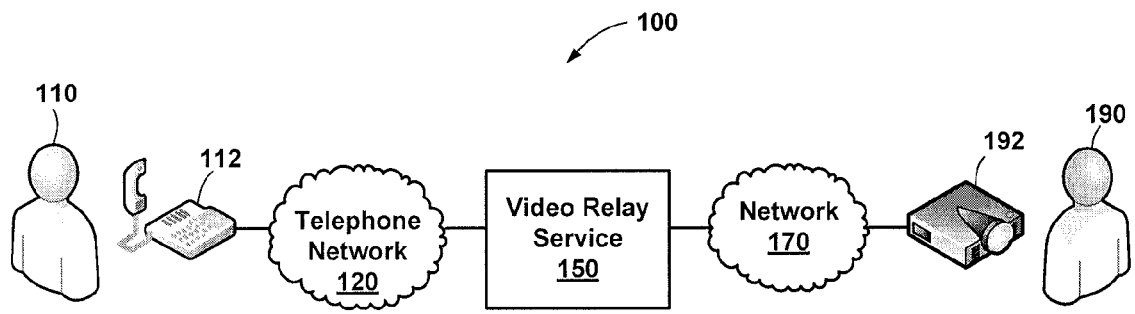
FIG. 1 is a simplified block diagram of a conventional audibly-impaired communication system.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present embodiments may be implemented on any number of data signals including a single data signal.

The various illustrative logical blocks, modules, circuits, and algorithm acts described in connection with embodiments disclosed herein may be implemented or performed with a computer processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A general-purpose processor may be a microprocessor, but in the alternative, the computer processor may be any electronic processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer, which should be considered a special purpose computer when configured to execute instructions (e.g., software code) for carrying out embodiments of the disclosure. Moreover, when configured according to embodiments of the disclosure, such a special-purpose computer improves the function of a general-purpose computer because, absent the disclosure, the general-purpose computer would not be able to carry out the processes of the disclosure. The disclosure also provides meaningful limitations in one or more particular technical environments that go beyond an abstract idea. For example, embodiments of the disclosure provide improvements in the technical field of recording, storing, and playing video messages as well as recording, storing, and presenting text messages.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments discussed herein include methods and apparatuses that provide customized greeting(s) in communications for audibly-impaired users. These customized greeting(s) may include a video message, a text message, or a combination thereof.

FIG. 1 illustrates a conventional communication system 100 useful for the audibly-impaired. The communication system 100 enables an audibly-impaired user 190 (may also be referred to herein as a deaf party 390) to engage in conversation through the communication system 100 with an audibly-capable user 110. The audibly-impaired user 190 may exhibit varying levels of impairment and may be a voice-capable audibly-impaired user or a voice-incapable audibly-impaired user. A communication session between the users is facilitated through the use of various types of equipment, which may be coupled together using one or more networks (120, 170), which may include a telephone network such as the Public Switched Telephone Network (PSTN). Alternatively, use of the term "telephone network" as used herein also contemplates other networks that are compatible and configured to provide communications using digital standards and data packets, an example of which includes Voice Over Internet Protocol (VOIP).

To interface an audibly-impaired user into a generally voice-based communication system, interpretive services may be employed allowing audibly-impaired users to communicate with a translator, such as, for example, through sign language. One means for relaying the communicative expressions of the audibly-impaired user 190 within the communication system 100 incorporates a video phone 192 for capturing and displaying the communicative expressions exhibited by the audibly-impaired user 190 and for displaying interpreted voice information originating from the audibly-capable user 110. The expressions, such as sign language and/or body language, may be interpreted or translated by a Video Relay Service (VRS) 150. The audibly-capable user 110 interacts in a conventional manner with the VRS 150 through a voice-based dialogue conveyed over a conventional voice phone 112 and occurring between the audibly-impaired user 190 and a translator at the VRS 150.

Figure 2:
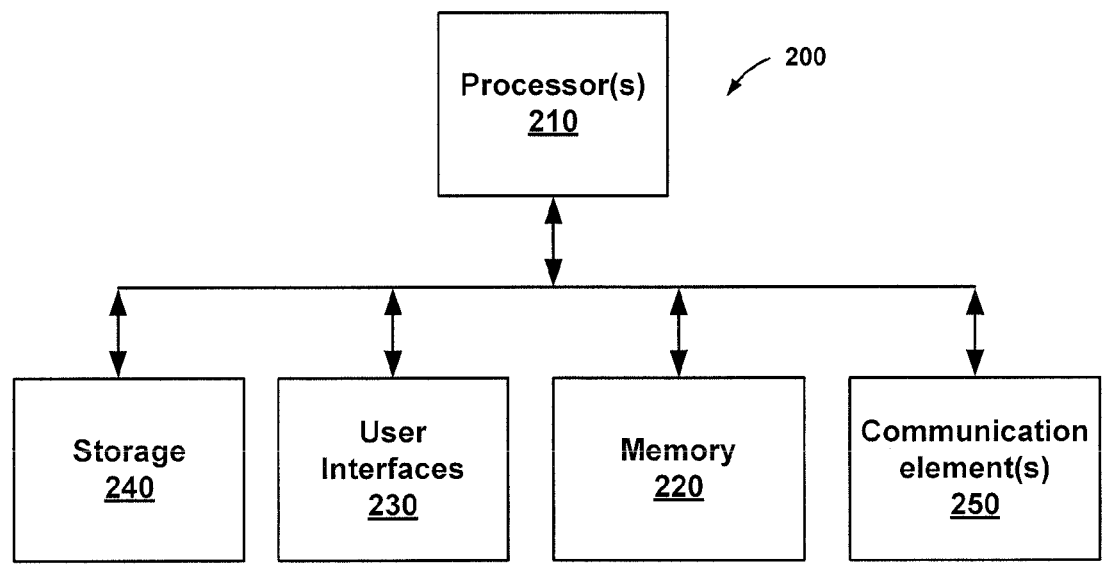
FIG. 2 is a simplified block diagram of processing hardware that may be used in accordance with one or more embodiments of the disclosure.

FIG. 2 illustrates a computing system 200 for practicing embodiments of the disclosure. Computer, computing system, video endpoint, mobile device, and server may be used interchangeably herein to indicate a system for using processing circuitry for practicing some embodiments of the disclosure. The processing circuitry may be custom circuitry or may be configured for executing software programs containing computing instructions. Thus, the computing system may include one or more processors 210, memory 220, one or more communication elements 250, user interface elements 230, and storage 240.

As non-limiting examples, the computing system 200 may be a user-type computer, a file server, a compute server, a notebook computer, a tablet, a handheld device, a mobile device, or other similar computer system for executing software.

The one or more processors 210 may be configured for executing a wide variety of operating systems and applications including the computing instructions for carrying out embodiments of the disclosure.

The memory 220 may be used to hold computing instructions, data, and other information for performing a wide variety of tasks including performing embodiments of the disclosure. By way of example, and not limitation, the memory 220 may include Synchronous Random Access Memory (SRAM), Dynamic RAM (DRAM), Read-Only Memory (ROM), Flash memory, and the like.

Information related to the computing system 200 may be presented to, and received from, a user with one or more user interface elements. As non-limiting examples, the user interface elements may include elements such as displays, keyboards, mice, joysticks, haptic devices, microphones, speakers, cameras, and touchscreens. A display on the computing system may be configured to present a graphical user interface (GUI) with information about some embodiments of the disclosure, as is explained below.

The communication elements 250 may be configured for communicating with other devices or communication networks. As non-limiting examples, the communication elements 250 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols.

The storage 240 may be used for storing relatively large amounts of non-volatile information for use in the computing system 200 and may be configured as one or more storage devices. By way of example, and not limitation, these storage devices may include computer-readable media (CRM). This CRM may include, but is not limited to, magnetic and optical storage devices such as disk drives, magnetic tapes, CDs (compact disks), DVDs (digital versatile discs or digital video discs), and other equivalent storage devices.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

When executed as firmware or software, the instructions for performing the processes may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

By way of non-limiting example, computing instructions for performing the processes may be stored on the storage 240, transferred to the memory 220 for execution, and executed by the processors 210. The processors 210, when executing computing instructions configured for performing the processes, constitutes structure for performing the processes and can be considered a special-purpose computer when so configured. In addition, some or all portions of the processes may be performed by hardware specifically configured for carrying out the processes.

The computing system 200 may be used for the video endpoints, servers, and computers, computing devices, processing devices, and communication devices described herein with varying levels of optional components.

Generally, when discussing calls, they are referred to from the deaf user's perspective. Thus, an "incoming call" is from an audibly-capable user to an audibly-impaired user and an "outgoing call" is from an audibly-impaired user to an audibly-capable user. Moreover, embodiments of the disclosures support audibly-impaired user to audibly-impaired user communications. Thus, an incoming call may be from an audibly-impaired user and an outgoing call may be to an audibly-impaired user.

Figure 3A:
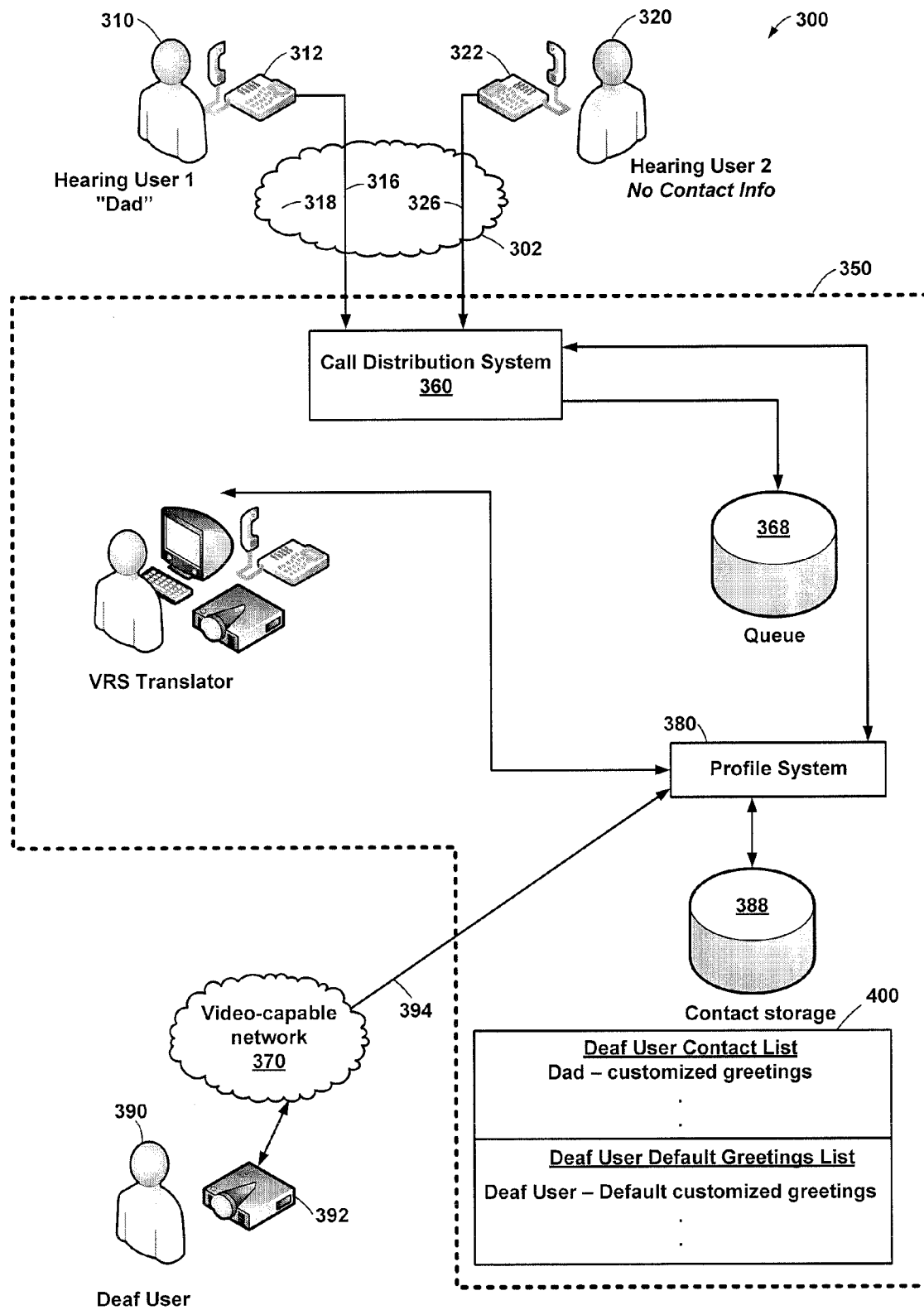
FIG. 3A illustrates a simplified block diagram illustrating a relay service configured for operation with an audibly-impaired communication system and showing a calling process for an audibly-impaired user.

FIG. 3A illustrates a simplified block diagram illustrating a relay service 350 configured for operation with an audibly-impaired communication system and showing a calling process for an audibly-impaired user 390. The relay service 350 may include a variety of services such as providing access to, and maintenance of, databases 388 associated with the audibly-impaired user. In some embodiments, a Video Relay Service (VRS) may be included for the audibly-impaired user. Thus, when referring to the relay service 350, it may include servers for providing access to services and databases 388 for the audibly-impaired user 390, provide VRS services, or combinations thereof as will be apparent from the context of the discussions below.

The communication system 300 includes one or more audibly-impaired communication systems 392 (one system shown in FIG. 3 for clarity), one or more voice-capable communication systems (312 and 322) and a relay service 350.

The audibly-capable user 310, 320 may use voice-capable equipment 312, 322 to communicate with the relay service 350 through voice-capable connections 316, 326 to a voice-capable network 302. The audibly-impaired user 390 may use the video-capable equipment 392 (also referred to herein as a video endpoint 392) to communicate with the relay service 350 through a video-capable network 370.

As used herein, voice-capable networks 302 and voice-capable equipment 312, 322 means networks and equipment that can process, convey, reproduce, or a combination thereof, sounds in the auditory frequencies as analog signals, digital signals or a combination thereof. As non-limiting examples, such equipment includes conventional telephones, conventional cellular telephones, and conventional computers or handheld devices with microphone and speaker type capabilities. As non-limiting examples, such networks include a telephone network such as the Public Switched Telephone Network (PSTN) and other networks that are compatible and configured to provide communications using digital standards and data packets, an example of which includes Voice Over Internet Protocol (VOIP).

As used herein, video-capable networks 370 and video-capable equipment 392 means networks and equipment that can process, convey, reproduce, or a combination thereof, multi-frame images. As non-limiting examples, such equipment includes conventional cellular telephones with video capability, and conventional computers or handheld devices with camera and display type capabilities. As non-limiting examples, such networks include cellular networks, WiFi networks, wide area networks, hard wired networks and other private data networks configured to provide communications using digital standards and data packets. To facilitate the enhanced bandwidth needs of video phones 392, the video-capable network 370 may be implemented as a high bandwidth network such as a DSL, Cable, Ethernet, or other enhanced-bandwidth networking technology.

Wireless networks may include any network using wireless electromagnetic signals, such as, for example, Wi-Fi, cellular phone networks, bluetooth, Zigbee, and near-field communication, that is capable of carrying information including at least audio signals and in some embodiments video signals.

In general, most video-capable networks 370 would be considered to also be voice-capable networks 302 and most video-capable equipment 392 would also be considered to be voice-capable equipment 312, 322.

Within the relay service 350, a call distribution system 360 may be included to answer calls from audibly-capable users 310, 320 through calling connections 316, 326 and route them to translators 330 (only one shown in FIG. 3 for clarity), place the calls in a queue 368, or provide a customized greeting if the audibly-impaired user 390 is not available to take calls. The incoming calls include a calling connection indicator such as, for example, a telephone number, an Internet Protocol (IP) address, a website address, or other unique indicator that indicates how the connection is made and from where the connection is made.

The call distribution system 360 may also query a profile system 380 to determine information about the audibly-capable user 310, 320 placing the call in response to the calling connection indicator. The profile system 380 may access a database 400 including contact storage 388 to obtain the information about the user placing the call, such as, for example one or more customized greetings identified with the audibly-capable user 310, 320 placing the call, the audibly-impaired user 390 receiving the call, or a combination thereof. The greeting information may be retrieved and sent to the audibly-capable user.

When the audibly-impaired user is not available, the relay service 350 may include a customized greeting to be played to a caller in lieu of a connection to the caller. This customized greeting may include a video greeting, a text greeting, or a combination thereof, for presentation on a video display of the caller.

As non-limiting examples, if the audibly-capable user 310, 230 were in the deaf user's contact list 400, the database may include a custom greeting tailored to that specific contact. Otherwise, the audibly-impaired user 390 may have a default greeting to use in the case where the call comes from someone not in the contact list or only the default greeting is enabled.

The database 400 maintained at the VRS 350 may be created, modified and updated by the audibly-impaired user 390 through a network connection 394 to the profile system 380 in the relay service 350. This network connection 394 may be any suitable network, such as for example the internet, the voice-capable network 302, or the video-capable network 370. The network connection 394 may also include tools such as web pages for viewing, updating and managing a phone book (i.e., database 400) by and for the audibly-impaired user 390. This phone book may include tools for managing greetings as explained more fully.

Figure 3B:
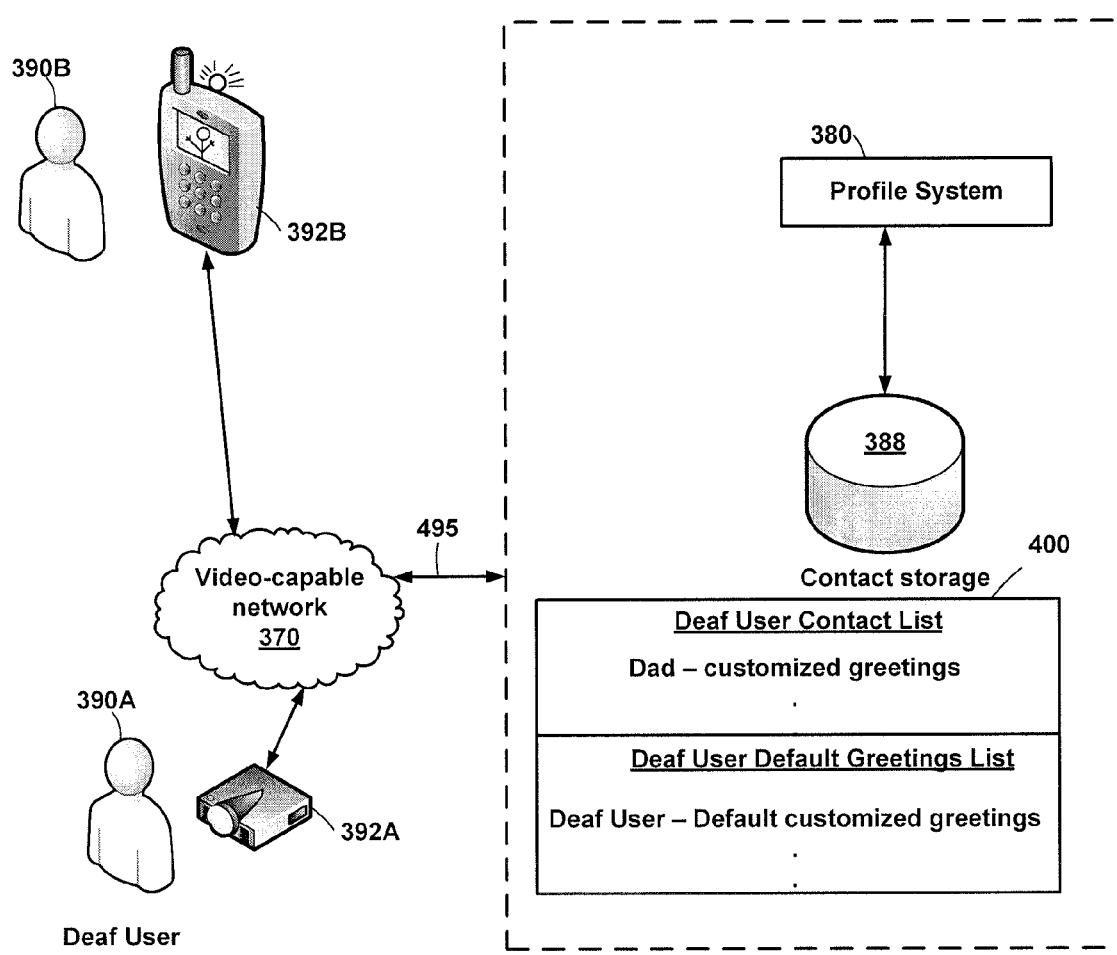
FIG. 3B illustrates a simplified block diagram illustrating the relay service configured for operation with an audibly-impaired communication system and showing a calling process for multiple audibly-impaired users using video endpoints.

FIG. 3B illustrates a simplified block diagram illustrating the relay service 350 configured for operation with an audibly-impaired communication system and showing a calling process for multiple audibly-impaired users (390A, 390B) using video endpoints (392A, 392B). In this configuration audibly-impaired users (390A, 390B) may communicate directly with each other without the need for a translator. In some embodiments, the audibly-impaired user 390A may use the video endpoint 392A to communicate through the video capable network 370 directly with the audibly-impaired user 390B using the video endpoint 392B. In some cases, the connection may be made without any communication with the relay service 350. In other cases, the relay service 350 may be included to provide services such as the profile system 380 and access to various databases 388, which may include the contact database 400.

FIGS. 4 and 5 are block diagrams illustrating entries in the contact database 400. In the table of FIG. 4, the database 400 may be thought of as a contact list or phone book for the audibly-impaired user 390 that identifies preferred greetings for the listed contacts. As a result, each audibly-impaired user 390 would have a separate table.

As explained below, the video endpoint 392 may include a keypad, keyboard, or mouse, or other data entry device configured to enable the audibly-impaired user 390 to initiate a communication session in a conventional manner by entering the telephone number of an audibly-capable user 310, 320 or audibly-impaired user 390B. In addition, the audibly-impaired user 390 may be able to interact with the database 400 using data entry devices on the video endpoint to make changes to the database 400 through the network connection 394.

The database includes entries 410 for contacts 420 of the audibly-impaired user 390. Each entry 410 may include a name for the contact 420, one or more connection indicators 430 for the contact 420, custom text greetings 440 and custom video greetings 450. Of course, other fields (not shown) useful in a phone book type database 400 may also be included. Moreover, FIGS. 4 and 5 are simplified diagrams intended to illustrate associations between entries. The databases may be much more complex with multiple fields and the fields may include links to other fields, other entries, other databases, and other files.

When a contact 420 makes a call that is received by the VRS 350, a calling connection indicator indicates the source of the call from the contact 420 (e.g., the cell phone number for Dad). The profile system may be used to correlate the calling connection indicator to an identified entry 410 (indicated by the dashed line to the entry for Dad) based on the connection indicators 430 associated with the identified entry 410.

As non-limiting examples, the connection indicators 430 may include web-site addresses associated with the contact 420, Internet Protocol (IP) addresses associated with the contact 420, wireless phone numbers associated with the contact 420 and wire-line phone number associated with the contact 420. A connection indicator 430 uniquely identifies a contact 420 within the database as well as a means of voice-capable connection 316, 326 (FIG. 3) to the VRS 350, the audibly-impaired user 390, and combinations thereof. For example, suppose a calling user makes a call to the audibly-impaired user 390, the calling user can be identified in the database 400 and a customized greeting for that calling user may be presented with the audibly-impaired user 390 is unavailable to take the call. Thus, the customized greeting may include the text greeting "Hi Dad, can't come to the phone now," the video greeting in Video file 2, or a combination thereof. The video in video file 2 may include a video of the audibly-impaired user 390 gesturing a default greeting or a specific greeting to "Dad" or any other type of other video file.

In the table of FIG. 5, the database 400 may be thought of as a listing of non-specific customized greeting for when the audibly-impaired user 390 is unavailable. The database includes entries 460 for various default greetings that may be used. For example, the greeting on line 1 uses the text greeting "Hi, You've reached John, please leave a message" along with video file 3. Similarly, the greeting on line 2 uses the text greeting "I am on vacation" along with video file 3. The greeting on line 3 uses the text greeting "I am in a meeting from 1 to 2 today" along with video file 4. More generally, the user may configure the database 400 with any number of video greetings and any number of text greetings. The text greetings and video greetings may then be combined in various ways depending on who is calling and whether the user wants to convey information such as, for example, why the user can't answer, where the user is, when the user will be back, etc. Thus, the text and video greetings may be customized in various ways for different callers and different situations such as day of the week or time of day.

While the databases 400 is illustrated as being resident on a server of the relay service 350, the databases 400 may also be present on one or more video endpoints 392 associated with the user. Moreover, these databases at various locations may be configured to synchronize and share entries with each other, either from a user request or in the background at various times, which may be defined by the video endpoint 392, the relay service 350 or a combination thereof.

Figure 6:
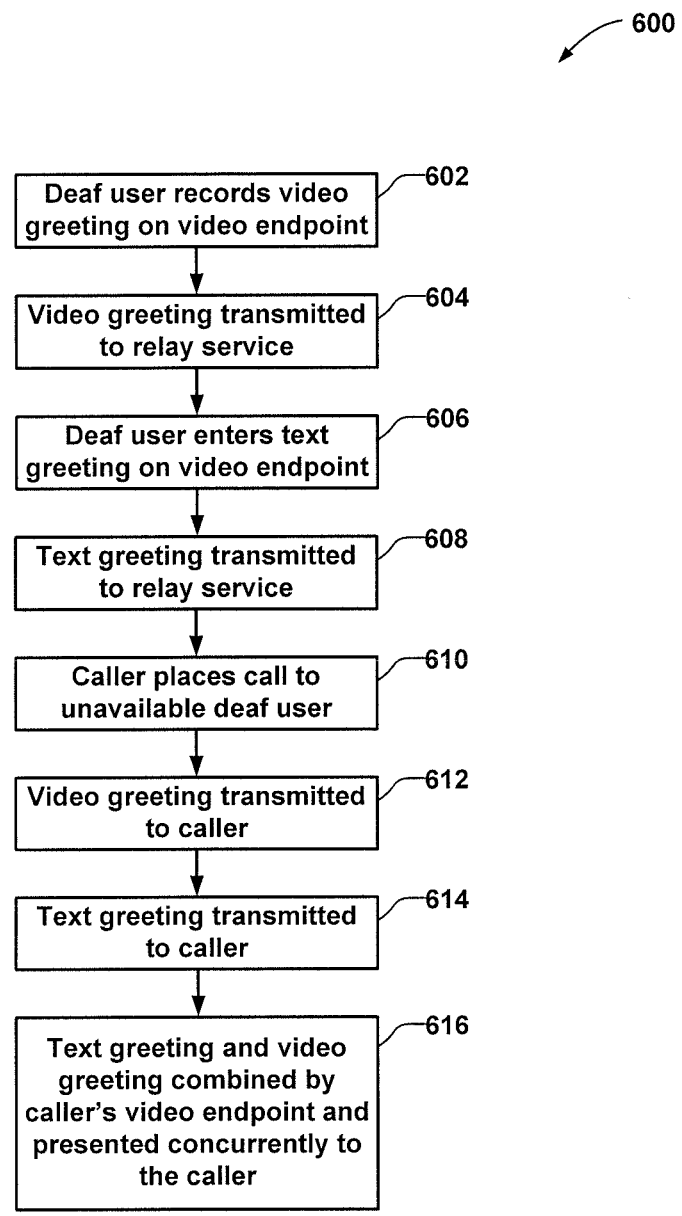
FIG. 6 is a flow diagram of a generalized process for some embodiments of the disclosure.

FIG. 6 is a flow diagram of a generalized process 600 for some embodiments of the disclosure. Reference may also be made to FIG. 3A through FIG. 5 when describing the process 600. At operation 602, the audibly-impaired user 390 records the video greeting on the video endpoint 392. This video endpoint may be any suitable device configured for recording video and implementing embodiments of the disclosure such as, for example, a video phone, a computer, a tablet device, or a smartphone.

At operation 604, the video greeting is transmitted to the relay service 350 to be stored in the database 400. This transmission may occur by the user requesting the transfer or it may be performed in the background at a specific event or time, which may be defined by the video endpoint 392, the relay service 350, or a combination thereof.

At operation 606, the audibly-impaired user 390 enters a text greeting on the video endpoint 392. This video endpoint may be any suitable device configured for enabling a user to enter text and implementing embodiments of the disclosure such as, for example, a video phone, a computer, a tablet device, or a smartphone.

At operation 604, the text greeting is transmitted to the relay service 350 to be stored in the database 400. This transmission may occur by the user requesting the transfer or it may be performed in the background at a specific event or time, which may be defined by the video endpoint 392, the relay service 350, or a combination thereof.

While not illustrated, the audibly-impaired user 390 may record a number of video greetings and enter a number of text greetings. Moreover, the video endpoint 392 may include tools for associating the various greetings with each other, with specific contacts, and with specific situations as described above. These various associations may be sent to the relay service 350 as association indicators.

At any time that the user has recorded a video greeting, entered a text greeting, and associated them with each other, the user may preview the text greeting presented as an overlay on the video greeting such that the video greeting and text greeting are concurrently merged as a video stream to display to the user.

Sometime later, at operation 610, a calling party places a call to the audibly-impaired user 390 at a time when the audibly-impaired user 390 is not available. The unavailability may be due to a number of different situations such as none of the user's video endpoints 392 are connected to a network, the user has specifically set that the user does not want to answer calls, or the user fails to answer the call after a predefined period of time. Thus, in some situations, the relay service 350 may determine that the audibly-impaired user 390 is unavailable. In other situations, the video endpoint 392 may determine that the audibly-impaired user 390 is unavailable.

At operation 612, when it is determined that the audibly-impaired user 390 is unavailable, the video greeting is transmitted to the video endpoint 392 of the caller. This transmission may be performed from the relay service 350 or may be performed directly from the video endpoint 392 of the audibly-impaired user 390.

Similarly, at operation 614, when it is determined that the audibly-impaired user 390 is unavailable, the text greeting is transmitted to the video endpoint 392 of the caller. This transmission may be performed from the relay service 350 or may be performed directly from the video endpoint 392 of the audibly-impaired user 390.

At operation 616, the text greeting and the video greeting are combined by the video endpoint 392 of the caller and presented to the caller with the text greeting presented as an overlay on the video greeting such that the video greeting and text greeting appear as a merged video stream to be displayed on the display of the caller's video endpoint 392.

While not illustrated, the merging of the appropriate video greeting and text greeting may be performed at different times and at different places. As one non-limiting example, the user selected video greeting and text greeting may be combined and stored on the video endpoint 392 of the audibly-impaired user 390. In such a situation, the combined video may be sent directly from the video endpoint 392 of the audibly-impaired user 390 to the video endpoint 392 of the caller. As another non-limiting example, the user selected video greeting and text greeting may be combined and stored on the relay service 350. In such a situation, the combined video may be sent directly from relay service 350 to the video endpoint 392 of the caller.

In some embodiments, the audibly-impaired user 390 may have multiple video endpoints 392. As a non-limiting example, the audibly-impaired user 390 may have a video phone at home, a computer at the office, a tablet device, and/or a mobile smartphone. Each of these devices may be reached by its own calling connection indicator such as, for example, a telephone number, an Internet Protocol (IP) address, a website address or other unique indicator that indicates how the connection is made and from where the connection is made. Moreover, the system may be configured such that a group number (i.e., calling connection indicator) may be used to reach the audibly-impaired user 390. In such a configuration, when a caller calls the group number, all of the video endpoints 392 associated with the group may be called in an attempt to reach the audibly-impaired user 390 on one of the devices. Also in this configuration, the audibly-impaired user 390 may create the video greeting on any of her video endpoints 392, create the text greeting on any of her video endpoints 392, and create the association between a video greeting and a text greeting on any of her video endpoints 392. Moreover, the association may be configured to be different such that the combined text and video that is displayed is one set if the group number is called, and different associations create different combinations for the various video endpoints 392 when a specific video endpoint 392 is called.

Figure 7A:
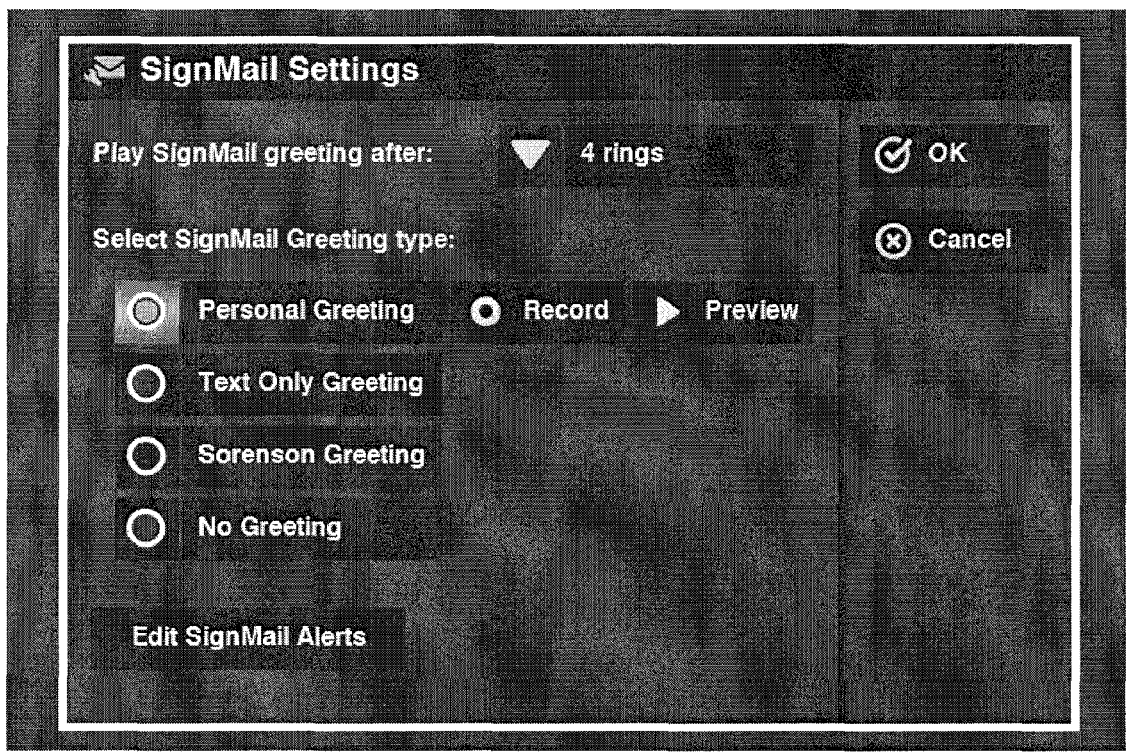
FIGS. 7A and 7B show an example user interface for selecting the type of video greeting and text greeting a user would like to create.
Figure 7B:
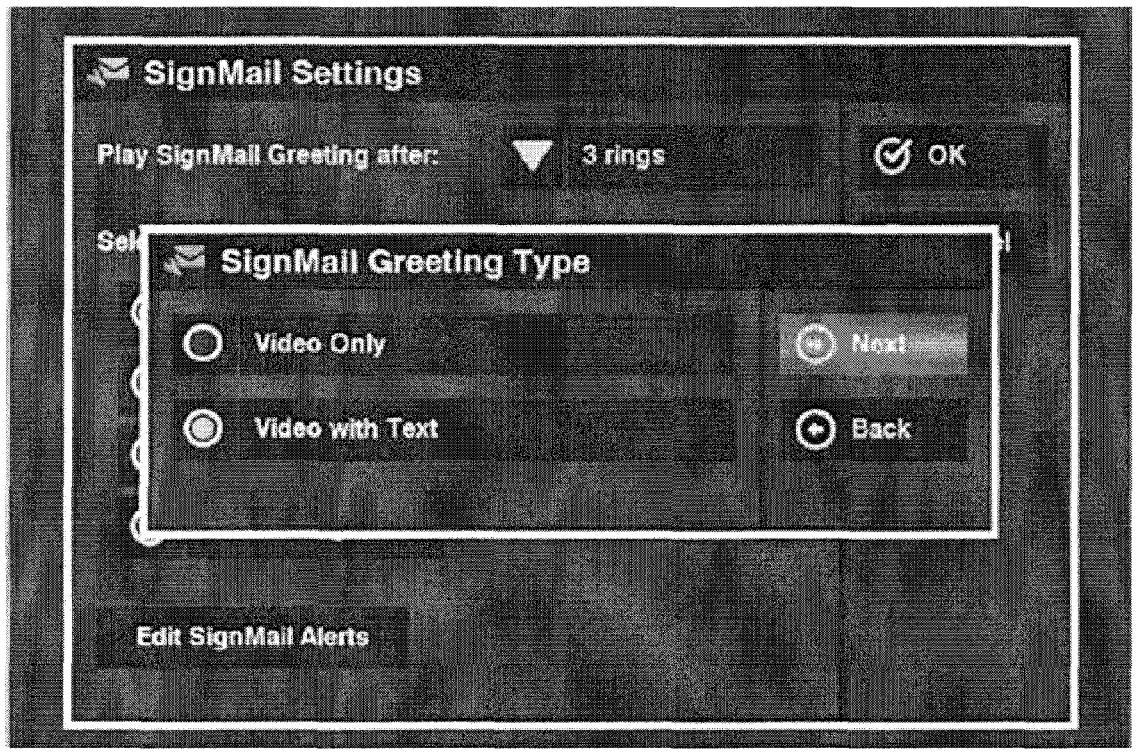

FIGS. 7A and 7B show an example user interface for selecting the type of video greeting and text greeting a user would like to create. As shown in FIG. 7A, the user may select a personal greeting (i.e., a video greeting), a text only greeting, a relay service specific greeting (e.g., Sorenson), or no greeting. Within the personal greeting, the user can select to record the video greeting or preview the video greeting. FIG. 7B shows a popup illustrating that the user may select that the personal greeting should include the video greeting only or should include a combination of the video greeting and the text greeting.

Figure 8A:
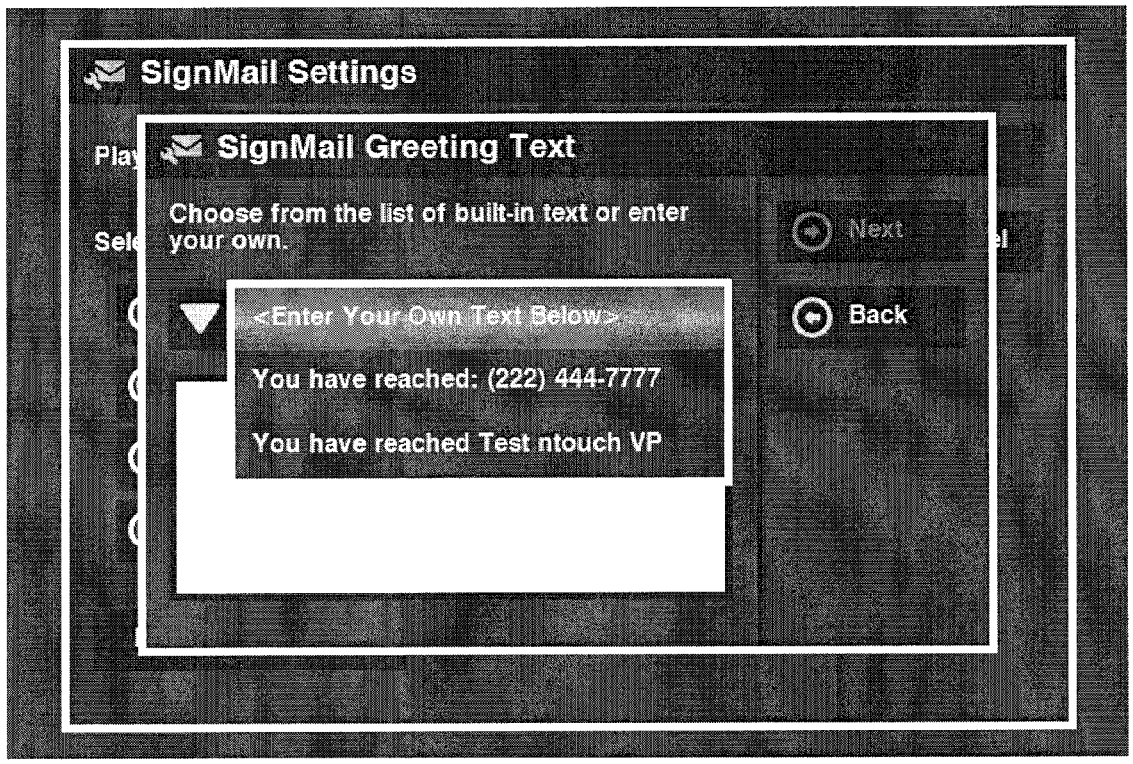
FIGS. 8A and 8B show an example user interface for entering a custom text greeting.
Figure 8B:
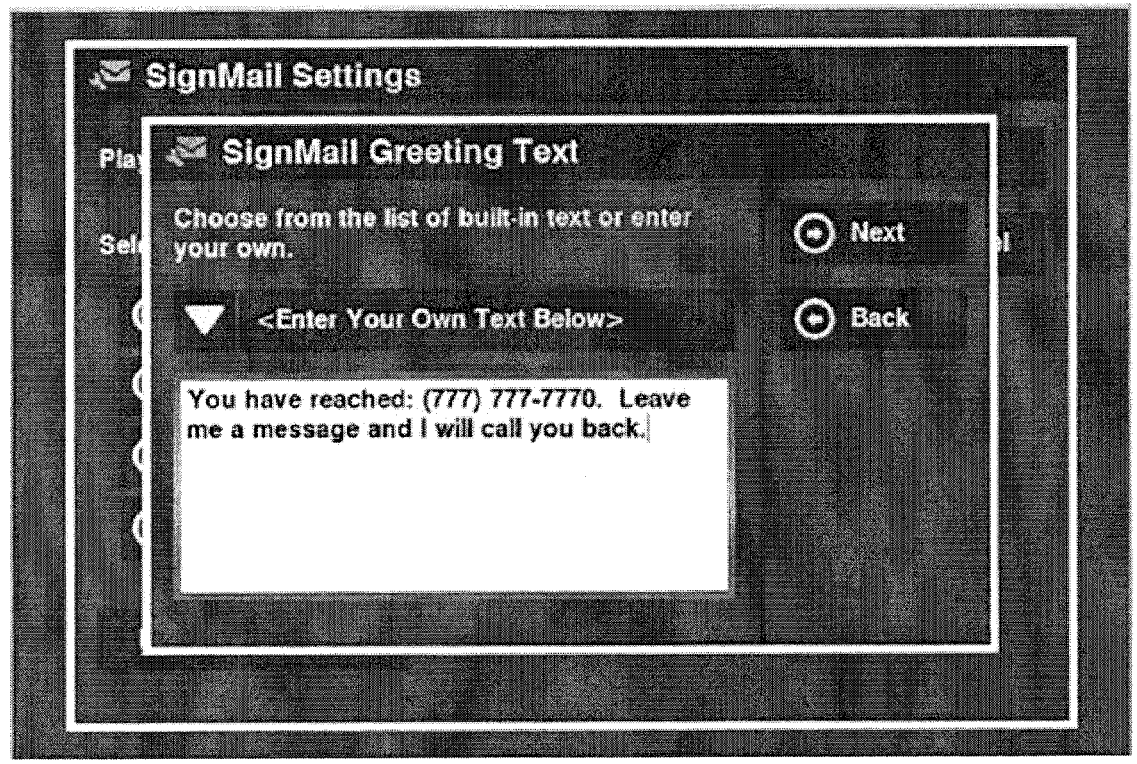

FIGS. 8A and 8B show an example user interface for entering a custom text greeting. FIG. 8A shows that the user has selected to enter his own text to customize the text greeting. FIG. 8B shows the text entered by the user to be used in the text greeting and/or the combination of the video greeting and the text greeting.

Figure 9A:
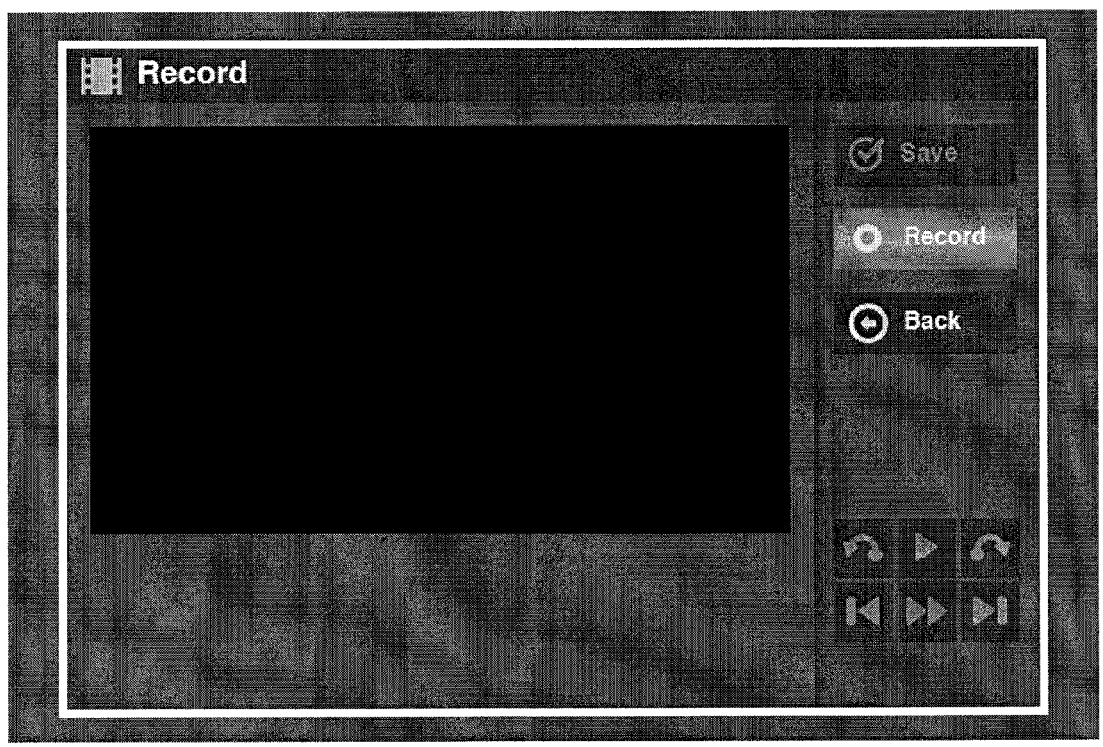
FIGS. 9A and 9B show and example user interface for recording a custom video greeting.
Figure 9B:

FIGS. 9A and 9B show and example user interface for recording a custom video greeting. FIG. 9A shows a video window that is blank and a record button that the user has just selected to begin entering the video greeting, which may include the user performing gestures to create the greeting. FIG. 9B shows the video greeting in the video window as it is being recorded and a stop button for the user to select to complete the video greeting.

Figure 10:
FIG. 10 shows an example user interface showing the combined text greeting and video greeting.

FIG. 10 shows an example user interface showing the combined text greeting and video greeting. In FIG. 10 this is a preview window so the user can determine if she is happy with the combination of the video greeting and the text greeting. Once approved, this combination is what will be presented on the video endpoint of the calling party.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A method for customizing at least one greeting for a video communication device, the method comprising:
   receiving an incoming call directed to a first video communication device associated with an audibly-impaired user an audibly-impaired user;
   routing the incoming call to a translator associated with a video relay service responsive to:
      determining that the audibly-impaired user is available to receive the incoming call; and
      determining that the calling party is associated with an audibly-capable user;
   determining that the audibly-impaired user is unavailable to receive the incoming call;
   querying a database with one or more contact entries for the first video communication device to determine whether the calling party is associated with a contact entry of the database;
   transmitting either a custom video greeting or a default video greeting to a second video communication device associated with a calling party that initiated the incoming call including:
      retrieving and transmitting the custom video greeting to the second video communication device responsive to determining that the calling party is associated with a contact entry of the database, wherein the custom video greeting and the contact entry are associated with each other in the database; and
      retrieving and transmitting the default video greeting responsive to determining that the calling party is not associated with a contact entry of the database.

2. The method of claim 1, wherein the custom video greeting is unique to an individual contact entry of the database.

3. The method of claim 1, further comprising:
retrieving a custom text greeting determining that the calling party is associated with a contact entry of the database;
retrieving a default text greeting responsive to determining that the calling party is not associated with a contact entry of the database; and
transmitting either the custom text greeting or the default text greeting to the second video communication device associated with the calling party that initiated the incoming call.

4. The method of claim 3, wherein transmitting the custom text greeting and the custom video greeting is performed as a merged video stream.

5. The method of claim 3, wherein transmitting the default text greeting and the default video greeting is performed as a merged video stream.

6. A method for customizing at least one greeting for a video communication device, the method comprising:
determining that an audibly-impaired user is unavailable to receive an incoming call to a first video communication device associated with the audibly-impaired user;
querying a database with one or more contact entries for the first video communication device;
retrieving a custom video greeting when the connection indicator for the incoming call corresponds to a contact entry for the first video communication device;
retrieving a default video greeting when the connection indicator for the incoming call does not correspond to a contact entry for the first video communication device; and
transmitting either the custom video greeting or the default video greeting to a second video communication device associated with a calling party that initiated the incoming call;
retrieving a custom text greeting when the connection indicator for the incoming call corresponds to a contact entry for the first video communication device;
retrieving a default text greeting when the connection indicator for the incoming call does not correspond to a contact entry for the first video communication device; and
transmitting either the custom text greeting or the default text greeting to the second video communication device associated with a calling party that initiated the incoming call, wherein transmitting the custom text greeting and the custom video greeting is performed as separate data streams.

7. A method for customizing at least one greeting for a video communication device, the method comprising:
determining that an audibly-impaired user is unavailable to receive an incoming call to a first video communication device associated with the audibly-impaired user;
querying a database with one or more contact entries for the first video communication device;
retrieving a custom video greeting when the connection indicator for the incoming call corresponds to a contact entry for the first video communication device;
retrieving a default video greeting when the connection indicator for the incoming call does not correspond to a contact entry for the first video communication device; and
transmitting either the custom video greeting or the default video greeting to a second video communication device associated with a calling party that initiated the incoming call;
retrieving a custom text greeting when the connection indicator for the incoming call corresponds to a contact entry for the first video communication device;
retrieving a default text greeting when the connection indicator for the incoming call does not correspond to a contact entry for the first video communication device; and
transmitting either the custom text greeting or the default text greeting to the second video communication device associated with a calling party that initiated the incoming call, wherein transmitting the default text greeting and the default video greeting is performed is performed as separate data streams.

8. A video relay service comprising:
a call distribution system configured to:
receive an incoming call directed to an audibly-impaired user;
route the incoming call to a translator associated with the video relay service responsive to:
determining that the audibly-impaired user is available to receive the incoming call; and
determining that the calling party is associated with an audibly-capable user;
transmit a custom video greeting to the calling party responsive to:
determining that the audibly-impaired user is unavailable to receive the incoming call; and
determining that the calling party is associated with a contact entry of a database, wherein the custom video greeting and the contact entry are associated with each other in the database; and
transmit a default video greeting responsive to:
determining that the audibly-impaired user is unavailable to receive the incoming call; and
determining that the calling party is not associated with a contact entry of the database.

9. The video relay service of claim 8, wherein the database is configured to be created and modified by the audibly-impaired user through a network connection.

10. The video relay service of claim 8, wherein the database is located in a data storage device of a server of the video relay service.

11. The video relay service of claim 10, wherein a copy of the database is located in the data storage device of a video communication device associated with the audibly-impaired user.

12. The video relay service of claim 8, further comprising a profile system configured to correlate a calling connection indicator received with the incoming call and a connection indicator that uniquely identifies a contact within the database.

13. The video relay service of claim 8, wherein the call distribution system is further configured to transmit a custom text greeting with the custom video greeting to the calling party.

14. The video relay service of claim 8, wherein the call distribution system is further configured to transmit a default text greeting with the default video greeting to the calling party.

15. The video relay service of claim 8, wherein the call distribution system is further configured to assign a group indicator to a plurality of video communication devices associated with the same audibly-impaired user, wherein each video communication device of the plurality also maintains a unique identifier.

16. The video relay service of claim 15, wherein custom greetings and default greetings associated with the same audibly-impaired user are shared among all video communication devices of the plurality that are assigned to a group indicator.

17. The video relay service of claim 16, wherein the call distribution system is configured to transmit a different combination of text and video greetings when the incoming call is placed to the group indicator than when the incoming call is placed to one of the individual identifiers.

18. A system comprising:
a video communication device specifically configured for use by an audibly-impaired user, the video communication device comprising:
a data storage device;
a user interface;
communication elements; and
a processor operably coupled with the data storage device, the user interface, and communication elements, the processor configured to:
communicate with a video relay service through the communication elements to establish calls with a far-end video communication device with the assistance of a translator within the video relay service; and
manage a database with contact entries associated with custom greetings that are used when a corresponding contact places an incoming call to the video communication device while the audibly-impaired user is unavailable, and at least one default greeting that is used when an individual who is not a contact places an incoming call to the video communication device while the audibly-impaired user is unavailable;
the video relay service configured to:
receive an incoming call directed to the video communication device;
route the incoming call to the translator responsive to:
determining that the audibly-impaired user is available to receive the incoming call; and
determining that the calling party is associated with an audibly-capable user;
retrieving a custom greeting and transmitting the custom greeting to the calling party responsive to:
determining that the audibly-impaired user is unavailable to receive the incoming call; and
determining that the calling party is associated with a contact entry of the database, wherein the custom greeting and the contact entry are associated with each other in the database; and
retrieving the default greeting and transmitting the default greeting responsive to:
determining that the audibly-impaired user is unavailable to receive the incoming call; and
determining that the calling party is not associated with a contact entry of a database.

19. The video communication device of claim 18, wherein the processor is further configured to generate and display a graphical user interface on the user interface of the video communication device, the graphical user interface configured to enable the audibly-impaired user to create custom greetings including at least one custom video greeting, at least one default video greeting, at least one custom text greeting, and at least one default text greeting.

20. The video communication device of claim 19, wherein the graphical user interface is further configured to enable the audibly-impaired user to select from one of a video only custom greeting, a text only custom greeting, or a combined video and text custom greeting for the custom greetings.

21. The video communication device of claim 19, wherein the graphical user interface is further configured to enable the user to select different custom greetings according to different times of day.

22. The video communication device of claim 18, wherein the video communication device is selected from the group consisting of a video phone, a computer, a notebook device, a tablet device, and a smartphone.

* * * * *